United States Patent [19]

Oudet

[11] Patent Number: 4,629,916
[45] Date of Patent: Dec. 16, 1986

[54] METHOD AND APPARATUS FOR HARMONICS SUPPRESSION IN MOTOR SYSTEMS

[75] Inventor: Claude Oudet, Besancon, France

[73] Assignee: Portescap, La Chaux-De-Fonds, Switzerland

[21] Appl. No.: 713,853

[22] Filed: Mar. 20, 1985

Related U.S. Application Data

[63] Continuation-in-part of Ser. No. 530,585, Aug. 3, 1983, Pat. No. 4,518,883.

[30] Foreign Application Priority Data

Dec. 4, 1981 [CH] Switzerland ............... 7766/81

[51] Int. Cl.⁴ .............. H02K 21/12; H02K 37/00
[52] U.S. Cl. .................. 310/49 R; 310/156; 310/162
[58] Field of Search ......... 310/49 R, 156, 162, 310/268; 318/696

[56] References Cited

U.S. PATENT DOCUMENTS

| | | | |
|---|---|---|---|
| 4,155,018 | 5/1979 | Oudet | 310/49 R |
| 4,297,625 | 10/1981 | Newell | 318/696 |
| 4,302,712 | 11/1981 | Pritchard | 318/696 |
| 4,330,727 | 5/1982 | Oudet | 310/268 |
| 4,424,463 | 1/1984 | Musil | 310/49 R |
| 4,496,887 | 1/1985 | Ichihara et al. | 310/156 |
| 4,517,478 | 5/1985 | Oudet | 310/49 R |
| 4,518,883 | 5/1985 | Oudet | 310/49 R |

Primary Examiner—Patrick R. Salce
Assistant Examiner—D. L. Rebsch
Attorney, Agent, or Firm—Cushman, Darby & Cushman

[57] ABSTRACT

A polyphase synchronous motor having a relatively large number of poles, constructed for substantial elimination of all significant harmonics. Harmonics are eliminated by dividing the motor into two symmetrical groupings, each a complete motor, then rotating one grouping relative to the other by an angle $\pi/h$ electrical degrees, where h is the order of the harmonic being suppressed. Also, with a permanent magnet disc rotor, the magnet poles on one face of the disc can be rotated relative to those of the other face in the same manner, to suppress a harmonic.

31 Claims, 21 Drawing Figures

METHOD AND APPARATUS FOR HARMONICS SUPPRESSION IN MOTOR SYSTEMS

CROSS REFERENCES TO RELATED APPLICATIONS

The present application is a continuation-in-part of application Ser. No. 530,585, filed Aug. 3, 1983, now U.S. Pat. No. 4,518,883.

INTRODUCTION

This invention relates to electric motors suitable for use in stepper systems, and more particularly, to motors and drive systems for achieving effective microstepping.

BACKGROUND OF THE INVENTION

Stepper motor systems commonly employ two phase synchronous motors in combination with an incremental drive system. The normal stepping sequence is achieved by energizing phase A with a positive signal, then energizing phase B with a positive signal, then energizing phase A with a negative signal, then energizing phase B with a negative signal and then repeating the sequence. The rotor of the motor is advanced incrementally in a four step sequence. The motor itself preferably includes a large number of poles so that one revolution of the motor includes a large number of incremental steps. The motor is also designed to provide significant stationary torque so that the motor will maintain positions without overheating. An example of such a motor is disclosed to U.S. Pat. No. 4,330,727. Since the control of the motor in such a system is in an on/off, or generally digital fashion, harmonics in the motor torque/displacement characteristic have little effect on the system operation and are of little concern in the system design.

More sophisticated stepper systems, however, employ a control technique called "microstepping" where the motor can be controlled for positioning at virtually any desired position intermediate the normal incremental positions. This is achieved by proportioning the signals applied to the phase A and phase B windings to obtain a field vector as required for the intermediate points. In such a system, since the control is basically analog rather than digital, harmonics have a substantial effect on control accuracy and are of great concern.

Harmonic suppression in motors has been known in the past. Typically, two phase motor designs inherently suppress the second harmonic whereas three phase designs suppress the second and fourth harmonic. Those even harmonics exist without current in permanent magnet motors.

In motors designed for stepper operations, considerable work has been carried out attempting to eliminate harmonics through careful control of the tooth shape of the magnetic pole pieces. This approach does achieve harmonic reduction but requires very exacting machine tolerances and difficult shapes and, hence, is not practical in most cases. Also, the tooth shape that suppresses one harmonic often tends to enhance other harmonics and therefore suppression of all significant harmonics is difficult or impossible to achieve in a practical design.

In the past, techniques have also been employed for reducing the detent or cogging forces in motors by skewing the motor slots. Although not generally regarded as such, this technique can be viewed as a form of harmonic suppression, since the cogging or detent forces result from field distortions in the motor. Skewing angles have usually been arrived at in a cut and try approach to minimize cogging without any conscientious attempt at cancelling or suppressing specific harmonics.

Reduction of static detent forces in single phase step motors, through pole position shifting to suppress the fourth harmonic is also known. See for example U.S. Pat. No. 4,155,018. Such single phase motors without the shifted poles cannot produce effective starting torque from certain rest positions. The shift in the pole positions to reduce the fourth harmonic tends to shift the static equilibrium mode point to a position where a larger starting torque is generated.

Microstepping systems have also been designed with "compensated" proportioning of the energizing signals. According to this technique, the deviation from the ideal position is measured for each microstep position and the proportioning of the energizing signals then adjusted accordingly. Unfortunately, with this technique the compensation is correct only for one set of torque and speed values and is not effective where the system must operate over a broad range of conditions.

SUMMARY OF THE INVENTION

The microstepper system according to the invention includes drive circuitry which provides multiphase energizing signals to the motor proportioned in accordance with desired microstep positions. By properly proportioning the signals, a field vector is established in the motor corresponding to the desired microstep position.

The motor according to the invention is a polyphase (e.g. two phase) synchronous motor having a relatively large number of poles and constructed to substantially eliminate all significant harmonics. By substantially eliminating harmonics in the torque/displacement characteristic, the proportioning of the drive signals can be sinusoidal quadrature values to provide substantially equal microsteps in the rotor position at all torque and speed values. The harmonics are eliminated according to the invention by, in effect, dividing the motor into two symmetrical groupings each comprising a complete motor, and then rotating one grouping relative to the other by an angle $\pi/h$ electrical degrees, where h is the order of the harmonic being suppressed. If the number of pairs of actually realized stator poles is $Z=2^u$, then the technique can be used to substantially eliminate u harmonics. In other words, if the number of existing stator pole pairs which can be moved is equal to 16, then 4 different harmonics can be substantially eliminated. In addition, another harmonic can be suppressed by establishing symmetrical groupings in the rotor permanent magnets and then shifting one group relative to the other.

Also, with a permanent magnet disc rotor, the magnet poles on one face of the disc can be rotated relative to those of the other face to suppress a harmonic.

It is understood that in the present specification and claims the terms of "eliminating" or "suppressing" harmonics include the meaning of "substantially reducing" those harmonics since residual amounts thereof may be present in the motor due to manufacturing tolerances, etc.

Generally, the preferred method of design for a two-phase motor according to the invention is to start with the lower harmonic, e.g., the third, and shift stator pole groupings to eliminate this harmonic. Next, the fourth harmonic is eliminated by shifting two groupings in each above grouping. Thereafter, the fifth harmonic can be eliminated by the same process. Using this rule, the highest harmonics can be eliminated between stator poles close to each other, while lower harmonics which have a more stable phase are eliminated between stator poles located at a larger distance. If there are many poles, 64 for example, a full cancellation can be made in each of 4 sets of 16 poles to keep the rule of cancelling highest harmonics between stator poles close to each other. The less significant harmonics like the eighth can be suppressed by shifting all stator poles on one side of the magnet versus the ones located at the other side. This cancellation is not as perfect as the previous one if the magnet is not exactly in the middle of the air gap. Shifting the rotor pole positions provides effective suppression but generally does not achieve a perfect cancellation and, therefore, is preferably used for the lesser harmonics, namely, the fifth or the eighth harmonic.

The proportioning of the drive signals applied to the polyphase stepper motor should be in accordance with the torque/displacement characteristic for the motor. With the microstepper motor according to the invention, wherein all significant harmonics are suppressed, the proportioning of the applied signals can be according to the sine and cosine values. Where desired, the positioning control can be further refined by adjusting the proportioned values according to actual torque/displacement characteristic. Since the motor characteristic is close to sinusoidal due to the harmonic suppression, the adjustments in the proportioned values are relatively modest and therefore effective over a broad operating range for the motor.

GENERAL DESCRIPTION OF THE DRAWINGS

Other characteristics of the invention as well as the properties and advantages obtained by the same will become apparent from the description given hereunder of various embodiments of the motor and control system described by way of example and shown in the drawings, which form a part of the specification, and wherein:

FIGS. 10B, 11B and 12B illustrate the vector torque addition;

DETAILED DESCRIPTION OF THE DRAWINGS

Figure 1:
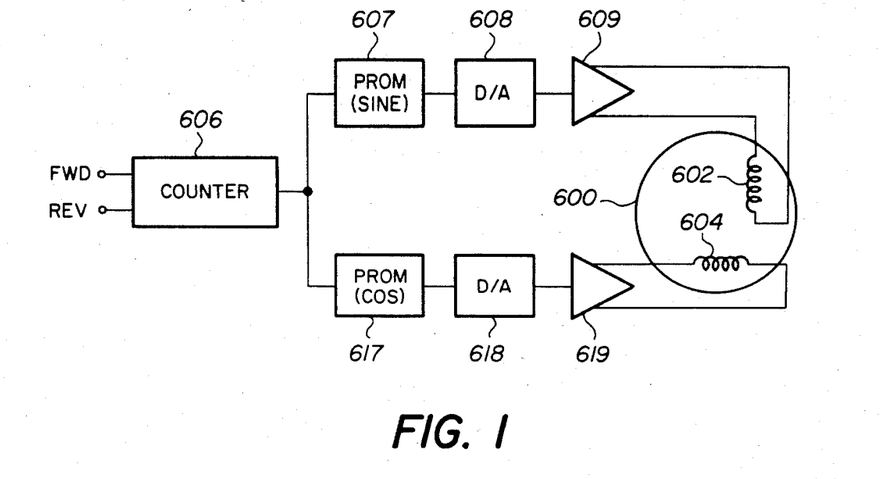
FIG. 1 is a schematic block diagram showing the control circuitry for a microstepping system according to the invention.

One embodiment of the motor drive circuitry for microstepping a two-phase synchronous stepping motor is shown in FIG. 1. Stepping motor 600 includes two-phase windings 602 and 604. The stepping position is controlled according to the digital count in a counter 606 which receives forward (FWD) and reverse (REV) pulses to cause the counter to count up and down. The digital output count from the counter is supplied as an address input to a sine PROM (programmable read only memory) 607 and to a cosine PROM 617. The digital outputs from PROM's 607 and 617 are supplied to digital to analog (D/A) converters 608 and 618 which in turn supply analog input signals to power amplifiers 609 and 619 respectively. Amplifier 609 supplies energizing current to motor winding 602 and drive amplifier 619 similarly provides energizing current to motor winding 604. The drive amplifiers are preferably of the chopper or pulse width modulated type.

The digital count appearing at the output of counter 606, which indicates the desired microstep position, is converted to a corresponding digital sine value by PROM 607 and is converted to a corresponding digital cosine value by PROM 617. The sine and cosine values are converted to corresponding analog signal values by converters 608 and 618, and currents proportional to these analog values are supplied to the motor by drive amplifiers 609 and 619.

The sine and cosine values can be used in PROM's 607 and 617 to accurately control micropositioning of the motor only if there are no substantial harmonics in the motor torque/displacement characteristic. As will be described hereinafter, the microstepping motor according to the invention is constructed to suppress all significant harmonics and therefore accurate microstep positioning can be achieved by using sine wave proportioning in the drive signals. The positioning accuracy can be further improved by adjusting the proportioned values to more exactly correspond to the torque/displacement characteristic of the motor. Since the significant motor harmonics are suppressed in the stepping motor according to the invention, the deviation from the ideal sinusoidal proportioned signals is small and, therefore, effective improvement in the accuracy can be achieved over a broad torque and speed range.

Figure 2:
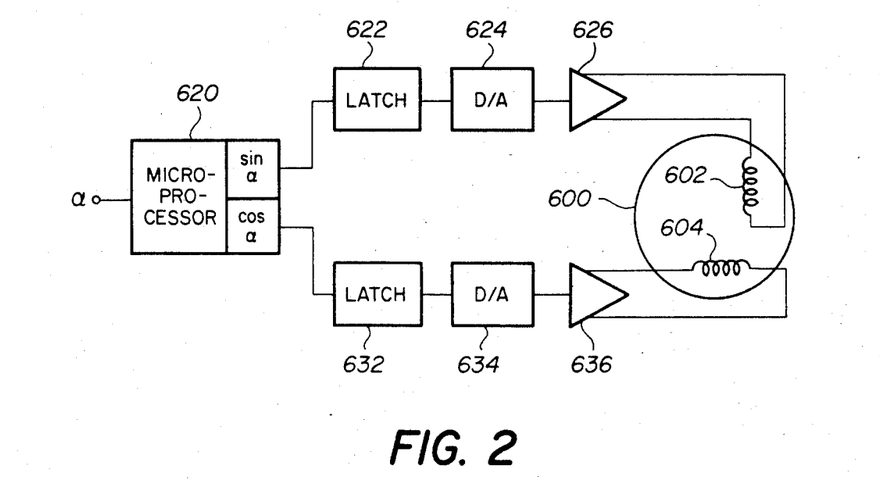
FIG. 2 is a schematic block diagram of another microstepper control system including a microprocessor.

Another embodiment of the drive circuitry for motor 600 is shown in FIG. 2 wherein a microprocessor is used to calculate the proportioned drive signals. Microprocessor 620 receives a digital indication of the desired microstep angular position alpha ($\alpha$) and produces digital values for sine and cosine at the two output parts. The digital output indications of the microprocessor are supplied to latches 622 and 632, respectively, to hold the digital indications during subsequent calculations by the microprocessor. The digital output of latch circuit 622 is converted to a corresponding analog value by D/A converter 624 and the analog signal is, in turn, converted to a corresponding drive current supplied to motor winding 602 by drive amplifier 626. Similarly, the digital output from latch circuit 632 is, in turn, converted to a corresponding analog signal by D/A converter 634 and the analog value, in turn, is converted to a drive current for winding 604 by drive amplifier 636.

Although the microprocessor can be programmed to calculate sine and cosine values, a faster and simpler approach is to obtain the values from a look-up table stored in the microprocessor memory. The use of a look-up table also permits adjustment of the proportioned values to the actual torque/displacement characteristic of the motor. The motor according to one embodiment of the invention comprises, on the one hand, a permanently magnetized rotative part which is mounted on the motor shaft and which presents a rotatory symmetry about the same, this part having a small thickness as compared to its outer diameter and being magnetized in the direction of its thickness so as to present on each of its opposite faces 2N magnetic poles of alternating polarity, N being a natural number, these poles being arranged regularly along an annular zone, and comprising, on the other hand, at least one magnetic stator circuit and at least two electric coils coupled with this magnetic circuit, each circuit comprising at least one air gap in which the magnetized part is placed, and at least two polar parts having an axial plane of symmetry and being arranged for co-operation with the magnetic poles of the magnetized part.

Each magnetic stator circuit includes a first and a second group of pole pieces or polar parts, each such group including at least two polar parts, the axial planes of symmetry of the polar parts in each group forming between each other at least approximately an angle of $2k\pi/N$, k being a natural number, and the respective axial planes of symmetry of a polar part of the first group and of a polar part of the second group forming between each other at least approximately an angle of $(2r+1)\pi/N$, r being a natural number, the polar parts of said first group being coupled with at least one coil and the polar parts of said second group being coupled with at least one other coil, the coils coupled respectively with the polar parts of the two groups being adapted to produce, in response to a given energizing current, magnetic fields having, in the transverse direction of the magnetized part, opposite directions for each of the two groups, each magnetic stator circuit comprising or being coupled with two yoke parts placed on either side of the magnetized part, so that the magnetic field produced in these circuits is substantially within the two space portions extending respectively above the magnetic poles of each face of the magnetized part.

The magnetized part can have substantially the form of a thin annular disc magnetized in the axial direction of the motor, the pole pieces or polar parts of the stator extending at least to the space portion above the annular magnetized zone of one of the surfaces of the disc.

According to a preferred embodiment, the polar parts of each stator circuit are arranged by pairs, the polar parts of each pair having respective axial planes of symmetry which are identical or shifted one with respect to the other by an angle not exceeding $\pi/3N$, two ends of the polar parts of each pair being arranged in facing relationship so as to form an air gap in which the magnetized part is placed, the ends opposite to those forming the air gap being connected between each other by corresponding yoke parts and the coils being placed respectively around each assembly of polar parts of a same group placed on a same side of the magnetized disc.

The respective axial planes of symmetry of the polar parts of each pair can in particular be shifted one with respect to the other by an angle of $\pi/3N$, $\pi/4N$ or $\pi/5N$. Furthermore, the axial planes of symmetry of the polar parts of each group can be arranged in order that the axial planes of symmetry of at least two polar parts next to each other in the circumferential direction of the motor comprise an angle of $(2\pi \pm \pi/4)N$, of $(2\pi \pm \pi/5)N$ or $(2\pi \pm \pi/3)N$. Moreover, the respective axial planes of symmetry of a polar part of the first group and of a polar part of the second group, on the same side of the magnetized part, can comprise an angle of $[(2r+1)\pi \pm \pi/4]/N$.

In a two-phase motor according to the invention, first and second groups of polar parts of the magnetic stator circuit or circuits associated with a first phase of the motor are arranged preferably in alternating relationship respectively with the first and second groups of polar parts of the circuit or circuits associated with the other phase of the motor.

Figure 3:
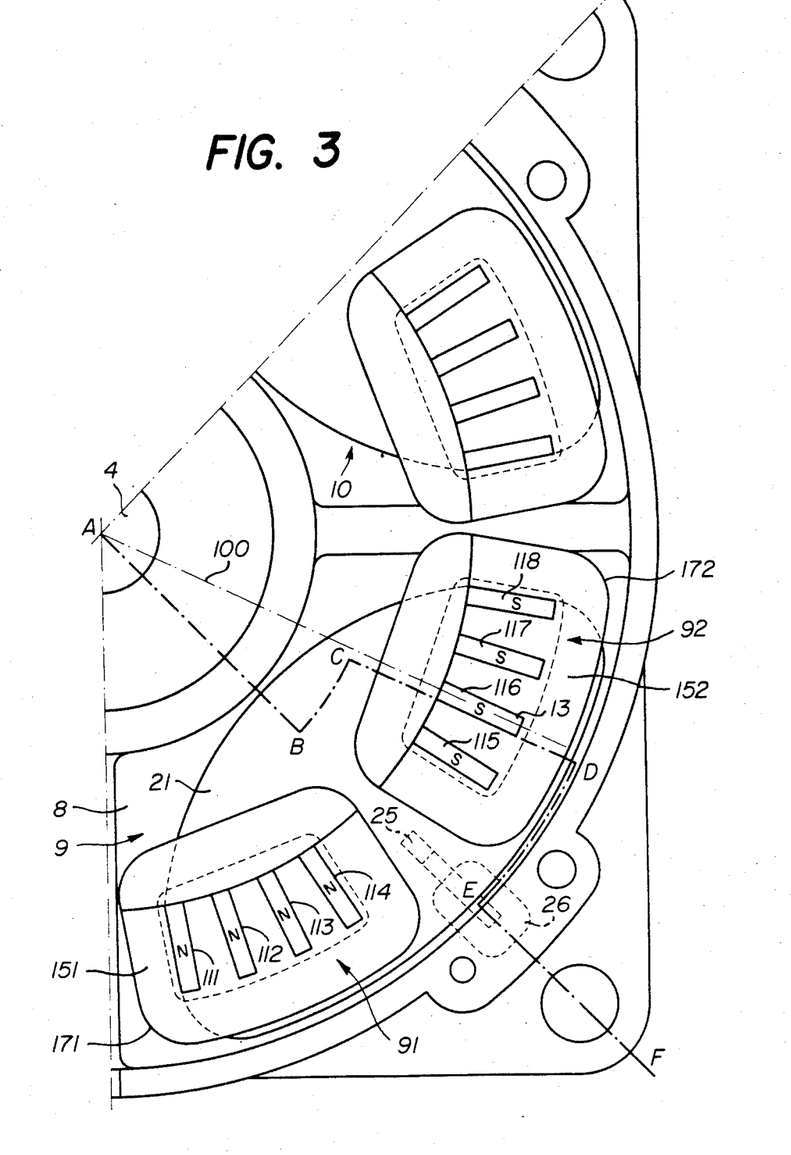
FIG. 3 is a partial top view of the lower part of the stator of one embodiment of the motor according to the invention.
Figure 4:
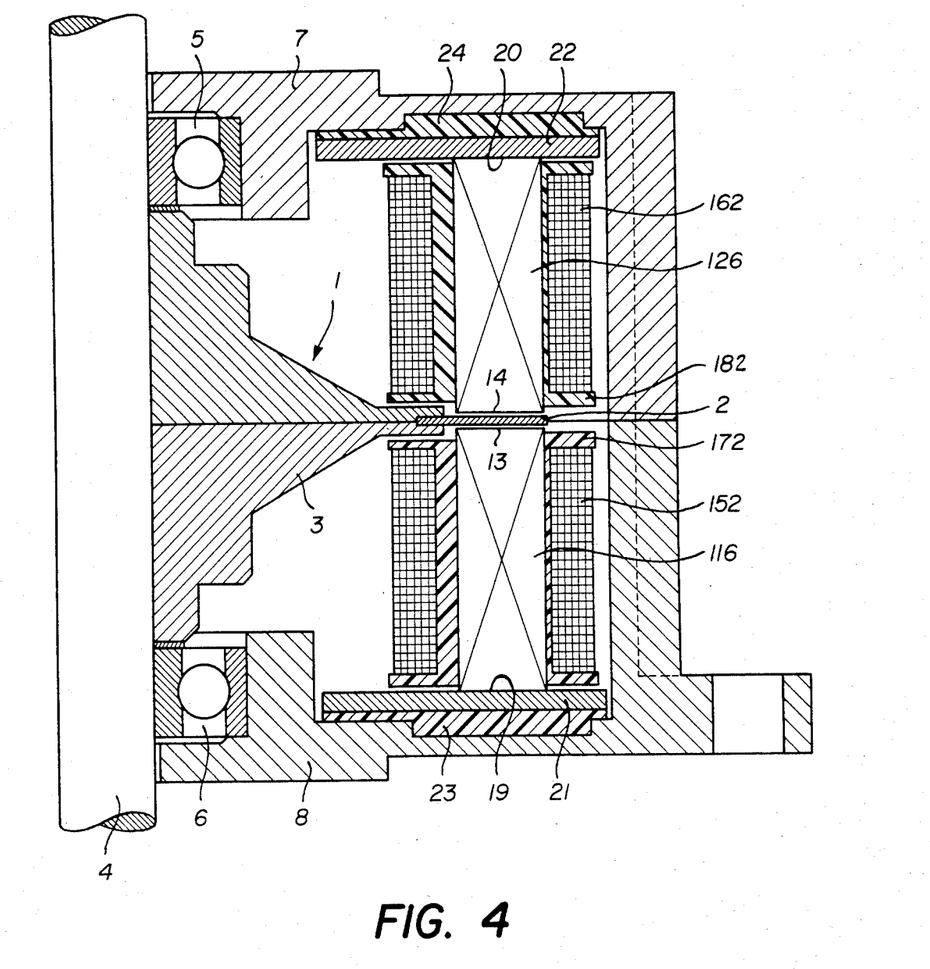
FIG. 4 is an axial section view of the motor partially represented in FIG. 3 along the broken line A-B-C-D-E-F-.

FIGS. 3 and 4 show a stepper motor the rotary element 1 of which comprises an annular disc 2 from a hard magnetic material and a supporting flange 3 from a non magnetic material, for instance a light alloy or a plastic material. The rotary element 1 is mounted on a motor shaft 4, which shaft is supported by two bearings 5, 6 fixed in a casing 7, 8 of the motor. The disc 2 is magnetized axially so as to present on each of its faces 2N magnetic poles of alternating polarity arranged regularly along the free annular zone of the disc, N being a natural number for instance equal to 50 in the case of the motor of FIG. 3.

The stator of the motor according to FIGS. 3 and 4 comprises four magnetic stator circuits of the same shape, the lower part of one of these circuits 9 being entirely visible on FIG. 3, said figure showing furthermore one half of the lower part of a neighbouring circuit 10.

Each stator circuit comprises a plurality of pairs of polar parts such as the pair 116, 126 of FIG. 4, formed by plates of magnetically permeable material or by an assembly of laminated sheets. The polar parts have an axial plane of symmetry designated by reference 100 in the case of polar part 116, and the free ends 13, 14 of one pair of polar parts such as 116, 126 form a narrow air gap in which moves the magnetized disc 2. Generally speaking, a plurality of pairs of polar parts, in the shown case 4 of them, form a group of polar parts, the polar parts placed on either side of the magnetized disc being respectively coupled with electric coils such as 152, 162. These coils are each supported by a coil support such as 172 and 182, these coil supports also constituting a support for the corresponding polar parts.

Each stator circuit thus comprises a first and a second group of polar parts such as the groups 91, 92 represented in FIG. 3, in which the respective bottom parts of these groups, 111, 112, 113, 114 and 115, 116, 117, 118 can be seen. On either side of the magnetized disc the ends of the polar parts which are opposite to the ends forming the air gap, namely the ends 19, 20 shown in FIG. 4, are connected to each other by a respective yoke part from magnetically permeable material such as the yoke parts 21, 22.

In the preferred embodiment of the motor according to FIGS. 3 and 4, each stator circuit 9, 10, ... comprises separate yokes and the same extend between the outer polar parts of the assembly of the two groups of each circuit, for instance the polar parts 111 and 118 for circuit 9. The different yoke parts are fixed to the casing 7, 8 of the motor through corresponding fixing parts such as 23, 24, the coil supports being fixed by conventional means to the corresponding yoke parts. FIG. 3 further shows the casing 171 of the bottom coil 151 of group 91.

A constructional variant using mechanically continuous yoke parts consists in providing saturable isthmuses between the various circuits, so as to substantially separate these circuits, from a magnetic point of view.

The axial planes of symmetry of adjacent polar parts form between each other an angle at least approximately equal to $2k\pi/N$, k being a natural number preferably equal to 1, which corresponds to a periodicity of the poles of same name appearing on the faces of the magnetized disc of the rotative part. The respective axial planes of symmetry of a polar part of the first group of polar parts and of a polar part of the second group of polar parts form between each other an angle at least approximately equal to $(2r+1)\cdot\pi/N$, where r is a natural number, this corresponding to an angular shift such that, for example, the polar parts of the first group 91 and the polar parts of the second group 92 cooperate respectively with the poles of different names of the magnetized disc and this being true for either side of the disc. In the case of FIG. 3, r takes the values from 1 to 4 depending on the considered polar parts of each group.

In each magnetic stator circuit the coils are energized, so that the magnetic field produced in the axial direction of the motor is of opposite polarity for the two groups of pairs of polar parts. Thus, in the top view of the lower part of the stator shown in FIG. 3, appear for example the poles N and S indicated on faces such as 13 of the polar parts of circuit 9 supposedly energized. The magnetic field closes in each stator circuit through the two yoke parts, which is to say within planes which are parallel to that of the magnetized disc. This field is substantially contained within the two cylindrical annular space portions having as a base the magnetized part 2 and extending on either sides of the same.

The present configuration thus leads to magnetic circuits of a minimum length and comprising a minimum iron mass. As a consequence, losses of magnetic energy by hysteresis and eddy currents are considerably reduced, as well as the motor weight and the required room, especially in the radial direction. It is also to be noted that the present structure takes full benefit of a magnetic orientation of the polar parts of the magnetic circuits.

The described arrangement further easily realizes a compensation of possible magnetization irregularities by which, for example on a same face of the magnetized disc, one series of poles predominates over the other.

The motor of FIGS. 3 and 4 is a two-phase motor in which the magnetic stator circuits associated with one of the phases are arranged so as to alternate with the magnetic circuits associated with the other phase of the motor; in the shown case, each phase comprises two stator circuits which are diametrically opposite.

In the present motor, the residual torque, namely the torque acting on the rotor in the absence of an electric current in the coils, due to the interaction between the magnetic poles of the magnetized disc with the polar parts of the stator, is greatly reduced. The influence of the basic component of this torque, namely the second harmonic, with respect to the fundamental frequency of the current, is in fact compensated by the two-phase structure.

Furthermore, a compensation of the remaining main component of the residual torque, namely the fourth harmonic, can be obtained in alternative ways, namely:

(1) inside each group of polar parts by a shifting of the respective axial planes of symmetry of the polar parts of the sub-groups formed by two polar parts following upon each other in the circumferential direction of the motor; this shifting is such that the axial planes of symmetry of the consecutive polar parts concerned form between each other an angle of $(2\pi+\pi/4)/N$; in the case where each group comprises an even number of polar parts in the circumferential direction, all consecutive axial planes of symmetry of the polar parts of said group form between each other said angle of $(2\pi+\pi/4)/N$;

(2) regarding each stator circuit, by the shifting of the two groups of polar parts comprising the same. This shifting with respect to each other of the two groups, each taken as a whole, results in the fact that the respective axial planes of symmetry of a polar part of the first group, such as 111, and a polar part of the second group, such as 115, situated on the same side of the magnetized part, form between each other an angle of $[(2r+1)\pi+\pi/4]/N$; such a compensation is of course made to the detriment of the compensation of the influence of the fundamental component which would require a precise angle of $(2r+1)\pi/N$;

(3) regarding both halves of the motor in the case the same comprises pairs of polar parts such as the pair 116, 126 of FIG. 4; the polar parts placed on either sides of the plane of the magnetized disc can indeed be considered as forming half-stators; the desired compensation of the components of harmonic 4 is thus obtained by shifting the said two half-stators, in other words the respective axial planes of symmetry of the polar parts of each pair, by an angle of $\pm\pi/4N$ with respect to each other.

This last way of compensating can also apply to the compensation of components due to harmonics of third or fifth order of the torque due to the electric current. In these cases, the two half-stators are shifted by $\pm\pi/3N$ or by $\pm\pi/5N$, depending on whether the effect of harmonic 3 or 5 is to be eliminated.

According to another embodiment of the motor, these components of harmonics 3 and 5 are compensated within each group of polar parts, which compensation can further be combined to advantage with a compensation of components of harmonic 4 of the residual torque by means of the above-mentioned shifting of half-stators.

To compensate harmonics 3 and 5 within a group of four polar parts such as for example 92, the axial planes of symmetry of consecutive polar parts are shifted with respect to each other in the circumferential direction of the motor so as to form sub-groups 115, 116 and 117, 118 comprising each two polar parts, so as to compensate the influence of harmonic 5, and, on the other hand, said two sub-groups are shifted, one with respect to the other, so as to compensate the influence of harmonic 3. In other words, the planes of symmetry of polar parts 115, 116 and 117, 118 are shifted by $\pm\pi/5N$ with respect to their theoretical spacing corresponding to an angle of $2\pi/N$ between these planes of symmetry, and the axial planes of symmetry of sub-groups 115, 116 and 117, 118 considered each as a whole, are shifted one with respect to the other by an angle of $\pm\pi/3N$. The entire shifting operation is effected in such a way that the resulting shifting apart with respect to the theoretical position of the polar parts is as small as possible. Thus, in the present example, the signs of the shifting angles are selected so as to bring the polar parts within each sub-group nearer to each other and to bring each of the sub-groups nearer to each other, which results in corresponding angles of: $(2\pi-\pi/5)/N$, $(2\pi-\pi/3+\pi/5)/N$ and $(2\pi-\pi/5)/N$ between the consecutive planes of symmetry within the group of four polar parts. It will be obvious for anyone skilled in the art that the desired compensation can be made in a similar way in the case of a different number of polar parts and that this compensation will be optimal when an even number of subgroups and an even number of polar parts within each sub-group is available.

In a preferred embodiment the motor according to FIGS. 3 and 4 is provided with magnetic sensing means such as the one indicated in dashed lines on FIG. 1, which comprises a magnetic circuit 25 and a sensing coil 26 coupled with this circuit. The magnetic circuit 25 can have a usual C-shape in the axial plane to form an air gap arranged so as to cooperate with the magnetized zone of disk 2, the polar parts of the circuit being placed on either side of this disk. The circuit 25 and the coil 26 form thus a magnetic sensor in which signals are produced by induction when the magnetic poles of disc 2 are passing along. An important advantage of the motor structure according to FIGS. 3 and 4 resides in the fact that this magnetic sensor can be placed between the two groups of polar parts of the magnetic stator circuit, namely in a zone where practically no magnetic field exists which could affect the operation of the sensor. It results from FIG. 3 that such a sensor can easily be placed in the indicated position, since the circuit and the coil can be of small dimensions and the presence of the sensor does not in practice increase the room required by the whole motor.

Figures 5, 7:
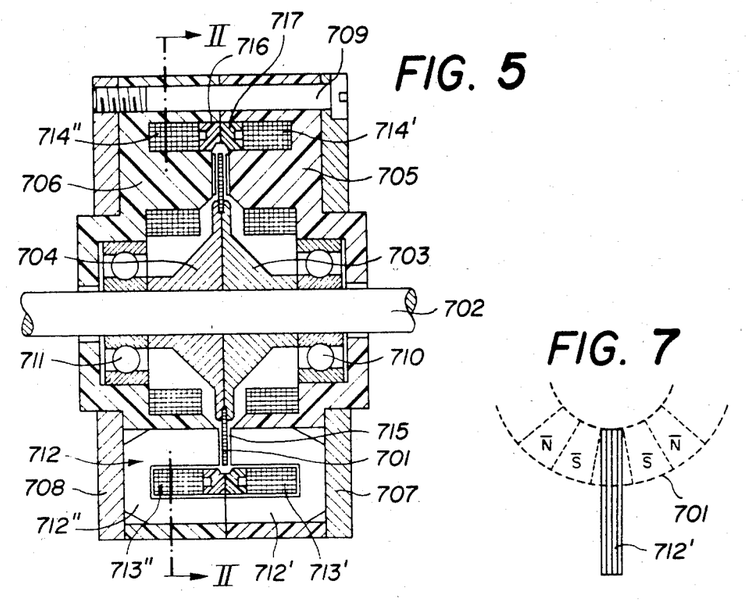
FIG. 5 is an axial sectional view of a two phase step motor in accordance with another embodiment of the invention taken along line I—I of FIG. 6.
FIG. 7 is a schematic plan view of an elementary magnetic circuit with individual coil and cooperating rotor.
Figure 6:
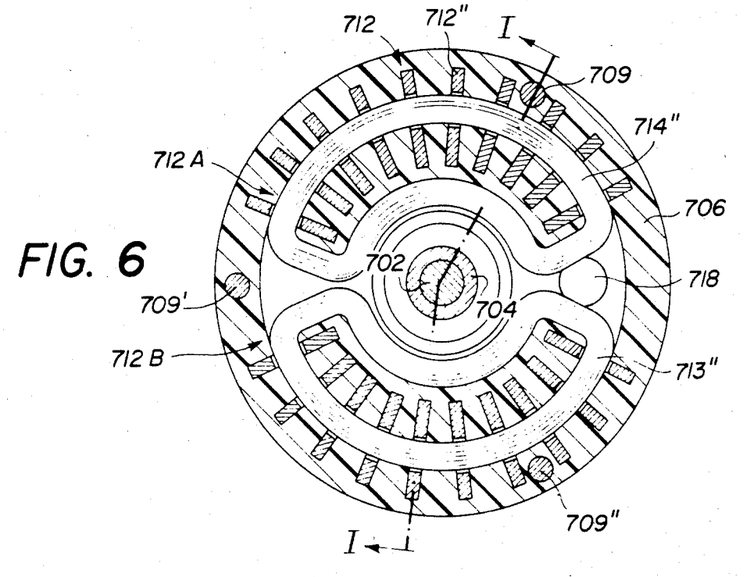
FIG. 6 is a sectional view of the motor along line II—II of FIG. 5.

Another embodiment of the motor is shown in FIGS. 5, 6 and 7. Referring to FIGS. 5 and 6, a step motor is shown which comprises an annular disc-shaped rotor 701 mounted on a shaft 702 by means of a pair of hub members 703, 704. Members 703, 704 are pressed onto the shaft 702 to support at their periphery the thin, annular rotor 701 made of permanent-magnetic material. The motor has a substantially symmetric structure with respect to a radial plane containing rotor 701. Two supporting members 705, 706 of a nonmagnetic material, for example of plastic, are arranged in axially facing relationship and are held together by means of annular flanges 707, 708, and screws 709, 709' and 709''. The motor shaft 702 is journaled for rotation by means of bearings 710, 711 lodged in supporting members 705, 706.

A plurality of elementary magnetic circuits 712 as well as electric coils 713', 713'', 714', 714'' are supported by the supporting members 705, 706.

Each elementary magnetic circuit 712 comprises two U-shaped thin stator pole pieces 712', 712'' of high magnetic permeability arranged in axially facing relationship and extending radially. The outer leg of each U-shaped pole piece 712' has its end-face in contact with the corresponding end-face of the outer leg of the opposite pole piece 712'', while the inner legs of the pole piece have their end-faces spaced to form an air gap 715 therebetween. The pole pieces can be made of plain soft iron or have a laminated structure for further improvement of the circuit quality.

As shown in FIG. 6, the elementary magnetic circuits are divided into two groups, 712A and 712B, each including ten pole pieces equally angularly spaced by an angle of $2\pi k/N$, where k is a whole number and N the number of pairs of rotor poles, in the embodiment shown $k=1$, and $N=25$.

The groups of elementary circuits are angularly shifted with respect to each other by an angle of $2\pi r/N + \pi/pN$, where p is the number of phases and r is a whole number, to assure proper operation of a multi-phase motor. In the embodiment shown, $r=3$ or 4 and $p=2$. Two electric coils or phase windings are coupled with each elementary magnetic circuit. The ten elementary circuits of group 712A are coupled to coils 714' and 714'', whereas the ten elementary circuits of groups 712B are coupled to coils 713' and 713''. The coils are arranged around legs of the U-shaped stator pole pieces defining the air gaps. The curved shape of the coils assures placement close to the respective legs.

Rings 716, 717 hold the coils in place. Connection wires for the coils are led through a hole 718 in flange 707.

FIG. 7 shows an individual elementary magnetic circuit 712', 712'' of a laminated structure, the legs of each U-shaped stator pole piece forming the above-mentioned airgap. FIG. 7 also shows, schematically, a peripheral annular zone of the rotor 701, of hard magnetic material which is axially magnetized to exhibit 2N magnetic poles of alternating polarity on either side thereof, such as the poles indicated "N" and "S".

Figure 8:
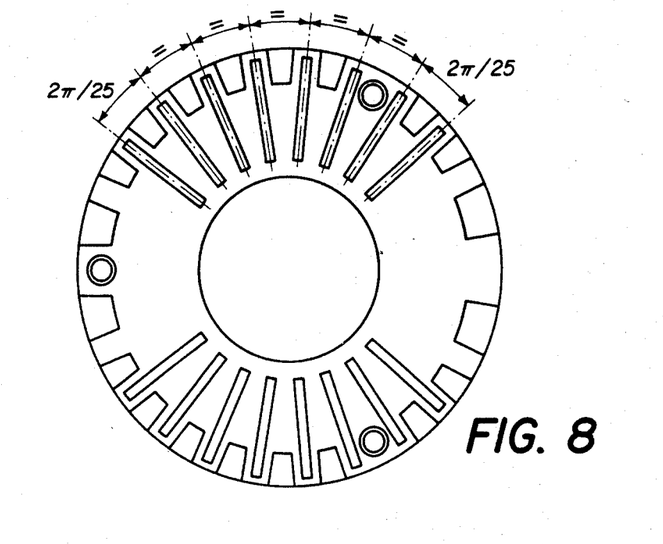
FIG. 8 is a diagram illustrating the customary spacing of the stator poles in a motor of the type shown in FIGS. 5 and 6 which does not incorporate the invention.
Figure 9:
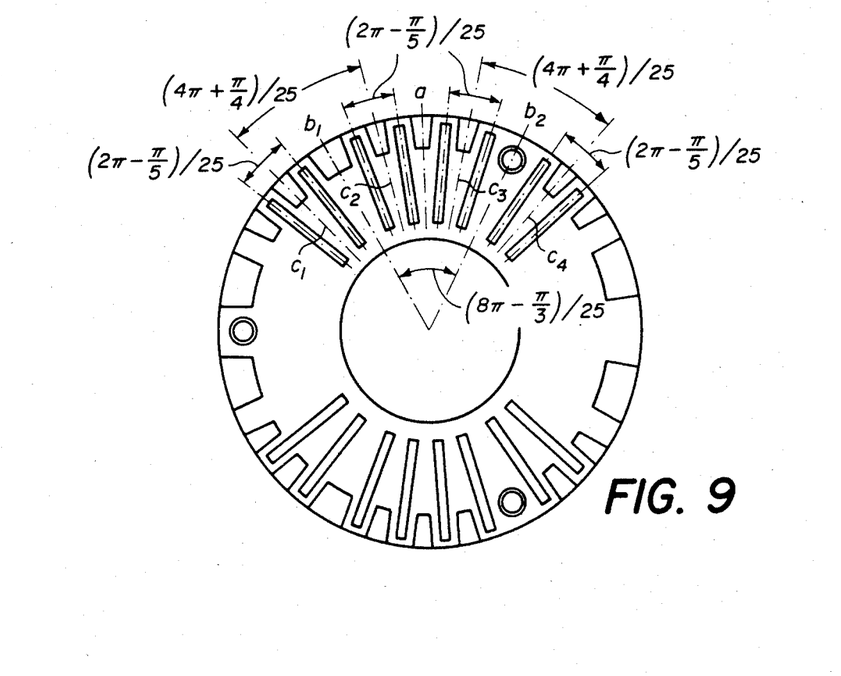
FIG. 9 is a similar view of the motor showing the pole position adjustments for eliminating the third, fourth and fifth harmonics.
Figure 10:
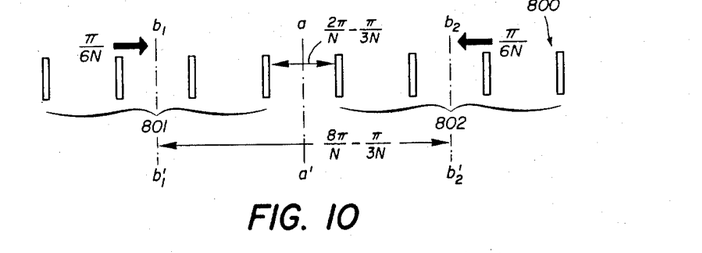
FIGS. 10, 11 and 12 are a series of illustrations showing the shift of stator pole positions to achieve harmonic cancellation.
Figure 11:
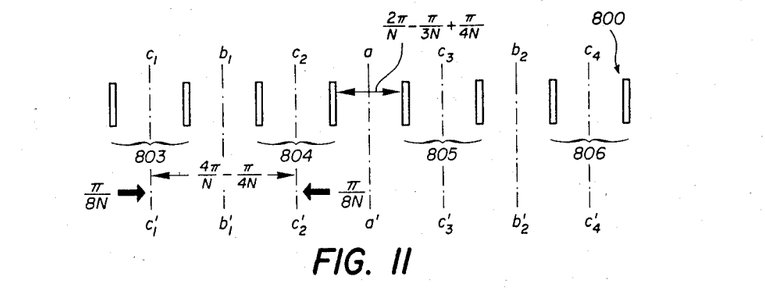
Figure 12:
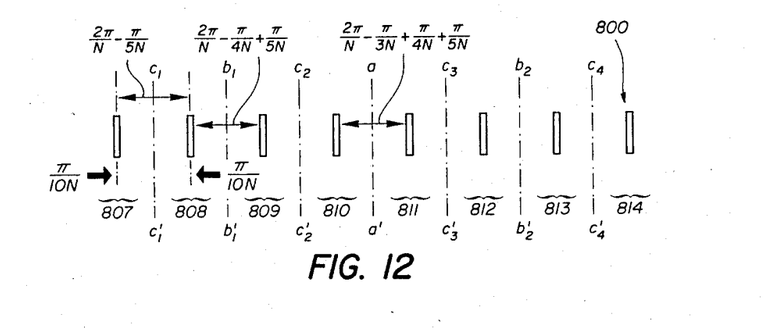

FIG. 8 is a schematic cross-sectional view of a motor similar to the motor of FIG. 5 to 7, showing, similarly to FIG. 6, the normal position of stator pole pieces without the invention, whereas FIG. 9 shows one of the possible displacements according to the invention where the stator pole pieces have been shifted to cancel the 3rd, 4th and 5th harmonics. FIGS. 10–12 are a series of diagrams illustrating the manner in which the design of FIG. 9 is derived. The motor of the illustration is a 50 pole two-phase motor, i.e., there are 25 circumferentially spaced north magnetic poles on each face of the rotor alternating with 25 south magnetic poles. The number of pairs of poles, N, is therefore equal to 25. The pole pitch is $2\pi/N$ degrees or 2 (360°) electrical degrees. The stator includes 8 pole pieces (polar parts) in the upper half of the illustration in FIGS. 8 and 9 coupled to the winding (coil) for one phase and 8 pole pieces in the lower half which are coupled to the other phase winding.

The number of pole pieces available for shifting to cancel harmonics is equal to eight. The number of harmonics that can be cancelled by shifting stator pole positions is the largest integer (natural number) power of two which is equal to or less than the number of available poles. Thus, with the specific example in FIGS. 8 and 9, since 2 to the 3rd power equals 8, 8 is the largest integer power equal to or less than the number of available poles, a maximum of 3 harmonics can be cancelled by shifting stator pole positions. As will be described later, additional harmonics can be suppressed by shifting rotor pole positions at the time of magnetizing the rotor.

Figure 10A:
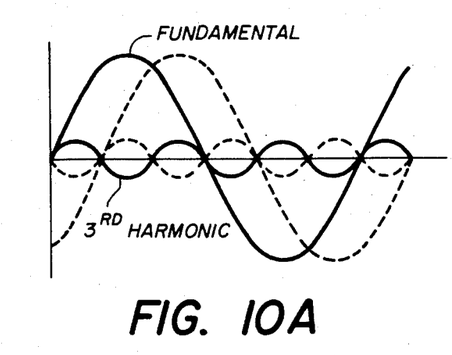
FIGS. 10A, 11A and 12B are illustrations showing the harmonic cancellation.
Figure 10B:
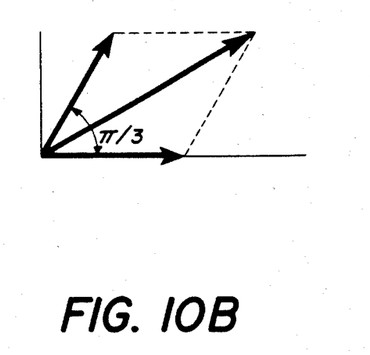

Normally, the shift of stator pole positions according to the technique of the invention is used to suppress or cancel the largest harmonics. In two-phase motors, the three largest harmonics are normally the 3rd, 4th and 5th harmonics. FIGS. 10–12 provide a step-by-step illustration of the manner in which the eight usable poles of each phase can be shifted to cancel three harmonics, specifically the 3rd, 4th and 5th harmonics. To simplify the illustration, only one set of eight usable stator poles 800 is shown and is depicted as a linear array. Initially, the spacing between adjacent stator poles is $2\pi/N$ degrees, with $N=25$, or $2\pi$ electrical degrees, as shown in FIG. 8. FIGS. 10, 10A and 10B illustrate the manner in which the 3rd harmonic is cancelled. The eight stator poles are divided into two symmetrical groupings 801 and 802 as shown in FIG. 10.

The axis of symmetry is designated by aa'. Each group is shifted by an angle of $\pi/6N$ towards the axis of symmetry aa' which is kept fixed for each phase in order to maintain the quadrature relationship between the two phases. This shifting results in an angle between the axes of symmetry of each of the groups 801 and 802, designated by $b_1b_1'$ and $b_2b_2'$, respectively, amounting to $8\pi/N - \pi/3N$. As shown in FIG. 10B, the torque components produced by the two groupings add vectorially, the result being a somewhat reduced output torque. The output torque vs. displacement from one grouping is illustrated in solid lines in FIG. 10A showing both the fundamental and 3rd harmonic. The other grouping, since symmetrical and identical, produces a substantial identical torque vs. displacement characteristic but is shifted by $\pi/3$ electrical degrees as shown in dotted lines. As can be seen in FIG. 10B, the fundamentals add vectorially, whereas the 3rd harmonics cancel as shown in FIG. 10A. Thus, the shift of the stator pole positions as indicated cancels out the 3rd harmonic.

FIG. 11 illustrates the next step in the design which is to cancel the 4th harmonic. In this case, each group of stator poles 801 and 802 is divided into two groups 803, 804, 805 and 806, respectively, each group including pairs of stator poles. Each group is shifted towards the respective axes of symmetry $b_1b_1'$ and $b_2b_2'$ determined previously and now kept fixed in order not to disturb the cancellation of the 3rd harmonic, the amount of the present shifting being $\pi/8N$. This results in the axes of symmetry of the pairs 803 and 804, designated by $c_1c_1'$ and $c_2c_2'$, respectively, being placed to form an angle of $4\pi/N - \pi/4N$ between each other. The same results for the respective axes of symmetry $c_3c_3'$, $c_4c_4'$ of the pairs 805 and 806.

Figure 11A:
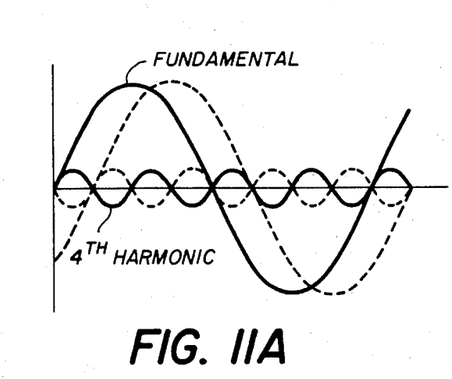
Figure 11B:
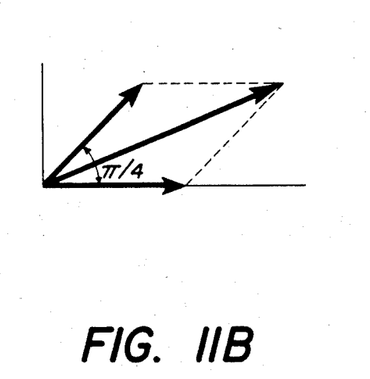

As shown in FIG. 11A the torques produced by the pairs of stator poles which were shifted towards each other result in the cancellation of the fourth harmonic thereof, and the fundamental components of these torques add vectorially as illustrated in FIG. 11B.

FIG. 12 shows the final steps tending to cancel the 5th harmonic of the torque produced by the current. The previously determined axes of symmetry $c_1c_1'$, $c_2c_2'$, $c_3c_3'$ and $c_4c_4'$ are kept fixed in order not to disturb the cancellation of the fourth harmonic already achieved. The axes of symmetry of the various stator poles 807, 808, 809, 810, 811, 812, 813 and 814 are now each shifted towards the axes $c_1c_1'$, $c_2c_2'$, $c_3c_3'$ and $c_4c_4'$ of the formerly considered pairs of poles, by an angle of $\pi/10N$. This results in an angular distance between poles 807 and 808 amounting to $2/N - /5N$ and the same applies to the other pairs of stator poles 809, 810; 811, 812 and 813, 814.

Figure 12A:
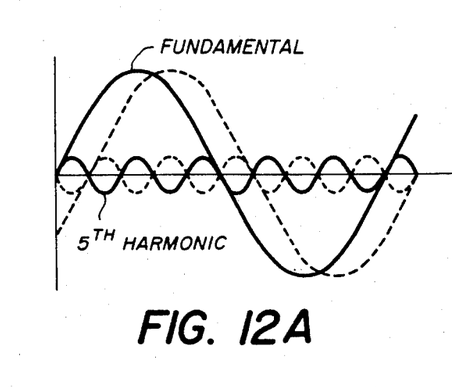
Figure 12B:
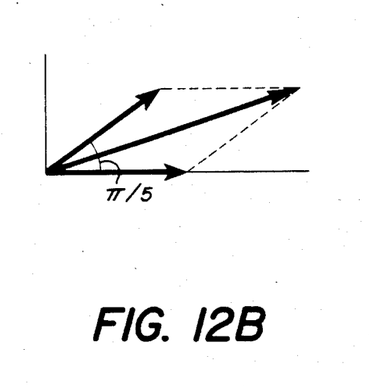

FIGS. 12A and 12B respectively illustrate in a similar manner as previously described, the cancellation of the fifth harmonics obtained by the final shifting and the vectorial adding of the fundamental components of the torque.

The actual displacement of the stator poles derived from the sequence illustrated in FIGS. 10–12 is as shown in FIG. 9. It is to be noted that generally, in each case where the plane of symmetry of one grouping is shifted relative to one other grouping by a predetermined angular displacement, the shift can be in either a positive or negative direction, and can be proportioned as desired between the two groupings. As can be seen in FIG. 9, the particular sequence previously described results in reasonable uniform spacing of stator poles and, hence, is a preferred design. The sequence used in the illustration is also desirable since cancellation of the 3rd and 5th harmonics tends to reduce the 4th harmonic, and cancellation of the 3rd, 4th and 5th harmonics also tends to reduce higher harmonics.

It is to be noted that harmonic cancellation can also be effected by angularly shifting the groups of stator poles arranged on either side of the rotor disc, with respect to each other. An angular shift by $\pi/h$ between the two groups considered each as a whole will produce cancellation of the harmonic of the order h in a similar way as described above in connection with the 3rd, 4th and 5th harmonics.

Figure 13:
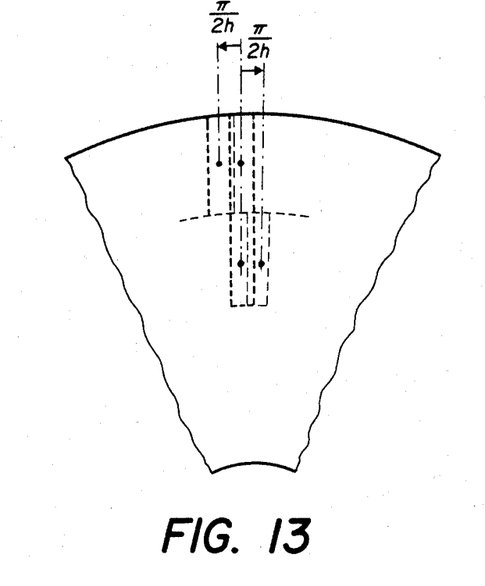
FIG. 13 is a schematic plan view of a rotor having concentric sets of magnetic poles.
Figure 14:
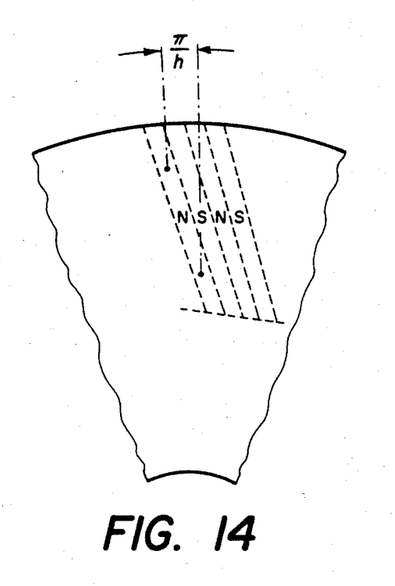
FIG. 14 is a schematic plan view of a rotor having skewed permanent magnet poles.

In addition to harmonic cancellation achieved by shifting stator pole positions, other harmonics can be suppressed through the shifting of rotor pole positions. As shown in FIG. 13, the permanent magnet rotor can be divided into two groupings such that one grouping 807 includes an outer set of permanent magnet poles, whereas the other grouping 808 includes an inner set of permanent magnet poles. The outer grouping 807 can be rotated to the left by $\pi/2h$ electrical degrees, whereas the inner grouping 808 can be similarly shifted to the right by $\pi/2h$ electrical degrees. The result is a displacement of the axial plane of symmetry for one grouping relative to the other by $\pi/h$ electrical degrees resulting in suppression of the harmonic h. Since the shifting of permanent magnet poles as shown in FIG. 13 may be difficult to achieve in practice, the design illustrated in FIG. 14 using skewed permanent magnet poles would normally be preferred. Selective suppression of a particular harmonic is achieved by shifting the average position of the outer half of the permanent magnet pole relative to the average position of the inner half of the permanent magnet pole by $\pi/h$ electrical degrees to suppress the harmonic h.

Figure 15:
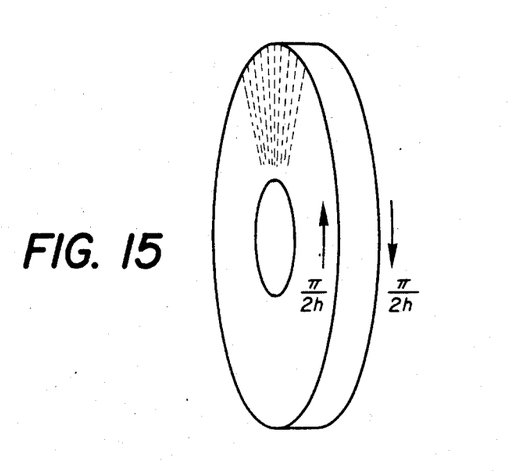
FIG. 15 is a schematic perspective view of a rotor formed of two parts rotated one with respect to the other.

Another harmonic can be suppressed by, in effect, using the plane of the rotor disc to divide the rotor into symmetrical groupings and then rotating the permanent magnet poles on one face relative to the other, which is achieved by the way of magnetizing the rotor. Selective suppression of the harmonic h is achieved by rotating the axial plane of symmetry for one grouping relative to the poles on the other face by $\pi/h$ electrical degrees (FIG. 15).

Substantially perfect cancellation of harmonics can be achieved by shifting stator poles as described above, but the same is not true with respect to the shifting of rotor poles, since the rotor is generally made from a magnetically oriented material. Preferably the larger harmonics are therefore cancelled through shifting of stator poles, whereas the lesser harmonics are suppressed by shifting of the rotor poles.

While only a few illustrative embodiments of the invention have been described in detail, it should be obvious to persons skilled in the art that many possible combinations for cancelling multiple harmonics are possible.

Also, as previously indicated, performance can be further improved in microstepping system by matching the energizing signal proportioning to the torque/displacement characteristics of the motor after major harmonics have been cancelled or suppressed. The invention is more particularly defined in the appended claims.

I claim:

1. A system for microstepping motor control comprising:
   circuit means for providing multi-phase signals proportioned to provide a plurality of step values for motor positioning between 0 and 2 electrical degrees;
   drive circuit means for providing poly phase energizing currents for the motor corresponding to said step values;
   a stepper motor including
   at least two phase windings connected to receive said energizing currents proportioned according to said step values,
   a plurality of pole pieces associated with each of said windings and providing a motor air gap,
   magnetic circuits for coupling said windings to said pole pieces,
   a rotor in said air gap being positionable in accordance with said proportioned energizing currents applied to said windings;
   each of said plurality of pole pieces being divided into at least one pair of substantially identical symmetrical groupings,
   the plane of symmetry of one grouping of a pair being shifted relative to the other grouping of the pair by an angle $\pi/h$ electrical degrees, wherein h is a harmonic being suppressed.

2. The system according to claim 1 for two-phase motor control, wherein said circuit is digital means and provides two-phase signals proportioned according to sine quadrature values.

3. The system according to claim 1, wherein said circuit means provides said multi-phase signals proportioned according to the motor torque/displacement characteristic with major harmonics suppressed.

4. The system according to claim 2, wherein said digital means includes a counter for indicating step position and a read only memory for providing said step values according to the step position indicated by said counter.

5. The system according to claim 2, wherein said digital means includes a microprocessor.

6. The system according to claim 1, wherein h is an odd number for suppression of the corresponding harmonic of the torque due to the electric current.

7. The system according to claim 1, wherein said stepping motor is a two-phase motor and wherein said pole pieces are divided into three different pair groupings shifted to suppress the 3rd, 4th and 5th harmonic.

8. The system according to claim 1, wherein said rotor is a thin permanently magnetized disc located in said air gap with magnetic poles on opposite faces of said disc.

9. The system according to claim 8, wherein said magnetic poles on one side of said disc are angularly displaced relative to the magnetic poles on the other side of $\pi/h'$ electrical degrees, wherein h' is a harmonic being suppressed.

10. The system according to claim 8, wherein the average angular position of the outer half of said magnetic poles is displaced from the average angular position of the inner half by $\pi/h''$ electrical degrees, wherein h'' is a harmonic being suppressed.

11. A polyphase electrical stepper motor comprising:
    a stator including:
      a plurality of stator pieces,
      at least two electrical phase windings,
      stator magnetic circuits for coupling said stator pole pieces to said windings, and
      said stator pole pieces being disposed to provide an air gap;
    a rotor with 2N magnetic poles coupled to said stator magnetic circuits through said air gap and being positionable in accordance with the proportioned energization of said phase windings, said plurality of stator pole pieces being divided into a pair of substantially identical symmetrical groupings,
    the plane of symmetry of one of said groupings being shifted relative to the other by an angle $\pi/hN$ wherein h is a harmonic being suppressed.

12. A stepper motor according to claim 11, wherein h is an odd number for suppression of the corresponding harmonic of the torque due to the electric current.

13. A stepper motor according to claim 11, wherein each of said pole pieces is associated with a separate magnetic circuit.

14. A stepper motor according to claim 11, wherein a plurality of pole pieces are associated with a common magnetic circuit including two yoke parts.

15. A stepper motor according to claim 11, wherein said rotor is a thin permanently magnetized disc located in said air gap.

16. A method of making an electric motor to substantially suppress different harmonics comprising the steps of:
    (1) dividing the motor into a pair of substantially identical, symmetrical groupings, each such grouping being an operative motor combination;
    (2) axially rotating one grouping of said pair relative to the other by $\pi/h$ electrical degrees, where h is a harmonic to be suppressed; and
    (3) repeating steps (1) and (2) for other pairs of groupings to suppress other harmonics, but keeping stationary the axis of symmetry of the pair of groupings previously rotated.

17. The method according to claim 16, wherein said motor is a two-phase stepper motor including a plurality of pole pieces and wherein said groupings are different pole piece groupings rotated to suppress the 3rd, 4th and 5th harmonics.

18. The method according to claim 16, wherein said motor is a polyphase stepper motor including a thin permanent magnet disc rotor and wherein one of said pair groupings is a pair grouping of rotor magnetic poles.

19. The method according to claim 17, wherein the magnetic poles on one side of said disc rotor are axially rotated relative to the magnetic poles on the other side of said disc.

20. The method according to claim 17, wherein magnetic poles at one radial distance on said disc rotor are axially rotated relative to magnetic poles at another radial distance.

21. The method according to claim 20, wherein said magnetic poles are skewed to achieve said relative rotation.

22. The method according to claim 16, wherein said motor is a polyphase stepper motor including a plurality of stator pole pieces and wherein said groupings are different pole piece groupings.

23. The method according to claim 22, wherein one of said groupings includes alternate pole pieces.

24. The method according to claim 22, wherein one of said groupings includes alternate pairs of pole pieces.

25. The method according to claim 22, wherein one of said groupings includes alternate groups of four or more pole pieces.

26. The method according to claim 21, wherein one of said groupings includes alternate pole pieces with one grouping rotated $\pi/5$ electrical degrees relative to the other, another of said groupings includes alternate pairs of pole pieces with one grouping rotated $\pi/3$ electrical degrees relative to the other, and another of said groupings includes alternate groups of four or more pole pieces with one grouping rotated $\pi/4$ electrical degrees relative to the other.

27. A polyphase electrical stepper motor comprising:
a stator including
   a plurality of stator pole pieces,
   at least two electrical phase windings,
   stator magnetic circuits for coupling said stator pole pieces to said windings, and
   said stator pole pieces being disposed to provide an air gap
   a rotor with 2N magnetic poles coupled to said stator magnetic circuits through said air gap and being positionable in accordance with the energization of said windings,
said plurality of stator pole pieces being divided into
   at least a first and a second different paired, substantially identical, symmetrical groupings
   the plane of symmetry of one grouping of said first pair being rotated $\pi/h'$ electrical degrees relative to the plane of symmetry of the other grouping of the pair to suppress the harmonic $h'$, and
   the plane of symmetry of one grouping of said second different pair being rotated $\pi/h''$ electrical degrees relative to the plane of symmetry of the other grouping of said second pair to suppress the harmonic $h''$.

28. A stepper motor according to claim 27, including three paired groupings, said paired groupings being rotated to suppress the 3rd, 4th and 5th harmonics.

29. A polyphase electrical stepper motor comprising:
a stator including
   a plurality of stator pole pieces,
   at least two electrical phase windings,
   stator magnetic circuits for coupling said stator pole pieces to said windings, and
   said stator pole pieces being disposed to provide an air gap;
a thin permanent magnet disc rotor, the magnetic poles on one side of said disc being axially rotated by $\pi/h$ electrical degrees relative to the magnetic poles on the other side of said disc, where h is a harmonic being suppressed.

30. A polyphase electrical stepper motor comprising:
a stator including
   a plurality of stator pole pieces,
   at least two electrical phase windings,
   stator magnetic circuits for coupling said stator pole pieces to said windings, and
   said stator pole pieces being disposed to provide an air gap;
a thin permanent magnet disc rotor having a plurality of magnetic poles, the magnetic poles at one radial distance of the disc being axially rotated by $\pi/h$ electrical degrees relative to magnetic poles at another radial distance, where h is a harmonic being suppressed.

31. The stepper motor according to claim 30, wherein said axial rotation is achieved by skewing said magnetic poles on said disc.

* * * * *